(12) United States Patent
Lopotko et al.

(10) Patent No.: US 11,848,457 B2
(45) Date of Patent: Dec. 19, 2023

(54) SMALL TACTICAL UNIVERSAL BATTERY AND METHODS OF INTERCONNECTION

(71) Applicant: Xentris Wireless LLC, Addison, IL (US)

(72) Inventors: Mark Lopotko, Lisle, IL (US); Michael Joseph Culen, Glen Ellyn, IL (US); Norikiyo I. Honda, Elk Grove, IL (US); Cameron Eckert, Markle, IN (US)

(73) Assignee: Xentris Wireless, LLC, Addison, IL (US)

( * ) Notice: Subject to any disclaimer, the term of this patent is extended or adjusted under 35 U.S.C. 154(b) by 285 days.

(21) Appl. No.: 17/141,285

(22) Filed: Jan. 5, 2021

(65) Prior Publication Data

US 2022/0216554 A1 Jul. 7, 2022

(51) Int. Cl.
*H01M 50/209* (2021.01)
*H01M 50/103* (2021.01)
(Continued)

(52) U.S. Cl.
CPC ....... *H01M 50/209* (2021.01); *H01M 50/103* (2021.01); *H01M 50/184* (2021.01); *H01M 50/247* (2021.01); *H01M 50/267* (2021.01)

(58) Field of Classification Search
CPC ............. H01M 50/209; H01M 50/247; H01M 50/184; H01M 50/267; H01M 50/103;
(Continued)

(56) References Cited

U.S. PATENT DOCUMENTS 3,999,110 A   12/1976   Ramstrom et al.
4,309,067 A   1/1982    Riley, Jr.
(Continued)

FOREIGN PATENT DOCUMENTS

KR   1020000015433   3/2000
KR   1020060074222   7/2006
(Continued)

OTHER PUBLICATIONS

Lee, Sun Hwa; International Preliminary Report on Patentability, for PCT/US2021/048395, dated Jul. 4, 2023, The International Bureau of WIPO, Geneva, Switzerland.
(Continued)

*Primary Examiner* — Christopher P Domone
*Assistant Examiner* — Jonathan William Estes
(74) *Attorney, Agent, or Firm* — Brian M. Holt

(57) ABSTRACT

A battery with a generally cuboid body with a top face. A cylindrical terminal extending from a center of the top face, a top of the cylindrical terminal provided with electrical contacts. A left tab and a right tab provided extending from the top face proximate a left end and a right end of the top face, respectively. A peripheral portion of each of the left and the right tabs forming a retaining groove extending from the top face; and an inward facing portion of the peripheral portion of each of the left and the right tabs facing the cylindrical terminal provided with an arc radius centered upon the center of the top face. The battery interconnectable with a range of electronic devices via a range of vectors and/or mechanics.

19 Claims, 12 Drawing Sheets

(51) Int. Cl.
*H01M 50/267* (2021.01)
*H01M 50/247* (2021.01)
*H01M 50/184* (2021.01)

(58) Field of Classification Search
CPC ............. H01M 50/543; H01M 50/553; H01M 50/557; H01M 50/522; H01M 50/556; H01M 50/56
See application file for complete search history.

(56) References Cited

U.S. PATENT DOCUMENTS

| | | |
|---|---|---|
| 5,607,791 A | 3/1997 | Garcia et al. |
| 5,683,831 A | 11/1997 | Baril et al. |
| 5,853,915 A | 12/1998 | Suto |
| 6,448,742 B1 | 9/2002 | Waterman et al. |
| 7,927,728 B2 | 4/2011 | Ha et al. |
| 8,150,476 B2 | 4/2012 | Crawford et al. |
| 9,203,063 B2 | 12/2015 | Celona et al. |
| 10,200,133 B2 | 2/2019 | Lee et al. |
| 11,708,952 B2 * | 7/2023 | Shanthikumar ......... F21V 23/06 362/157 |
| 11,711,567 B2 * | 7/2023 | Garel .................. G06F 9/45537 725/110 |
| 2004/0106036 A1 | 6/2004 | Geis et al. |
| 2006/0201558 A1 | 9/2006 | Marty et al. |
| 2008/0084181 A1 | 4/2008 | Griffin |
| 2008/0169788 A1 | 7/2008 | Bobbin et al. |
| 2013/0008682 A1 | 1/2013 | Turner et al. |
| 2016/0206276 A1 | 7/2016 | Kaisha |
| 2018/0108883 A1 | 4/2018 | Enari et al. |
| 2020/0020896 A1 * | 1/2020 | Lim ...................... H01M 50/55 |
| 2020/0197027 A1 | 6/2020 | Hershberger et al. |

FOREIGN PATENT DOCUMENTS

| | | | |
|---|---|---|---|
| KR | 1020120104007 | 9/2012 | |
| WO | WO-2019027115 A1 * | 2/2019 | ................ B25F 5/00 |

OTHER PUBLICATIONS

Park, Hye Lyun; International Search Report and the Written Opinion of the International Searching Authority, for PCT/US2021/048395, dated Dec. 21, 2021, Korean Intellectual Property Office, Daejeon, Republic of Korea.

* cited by examiner

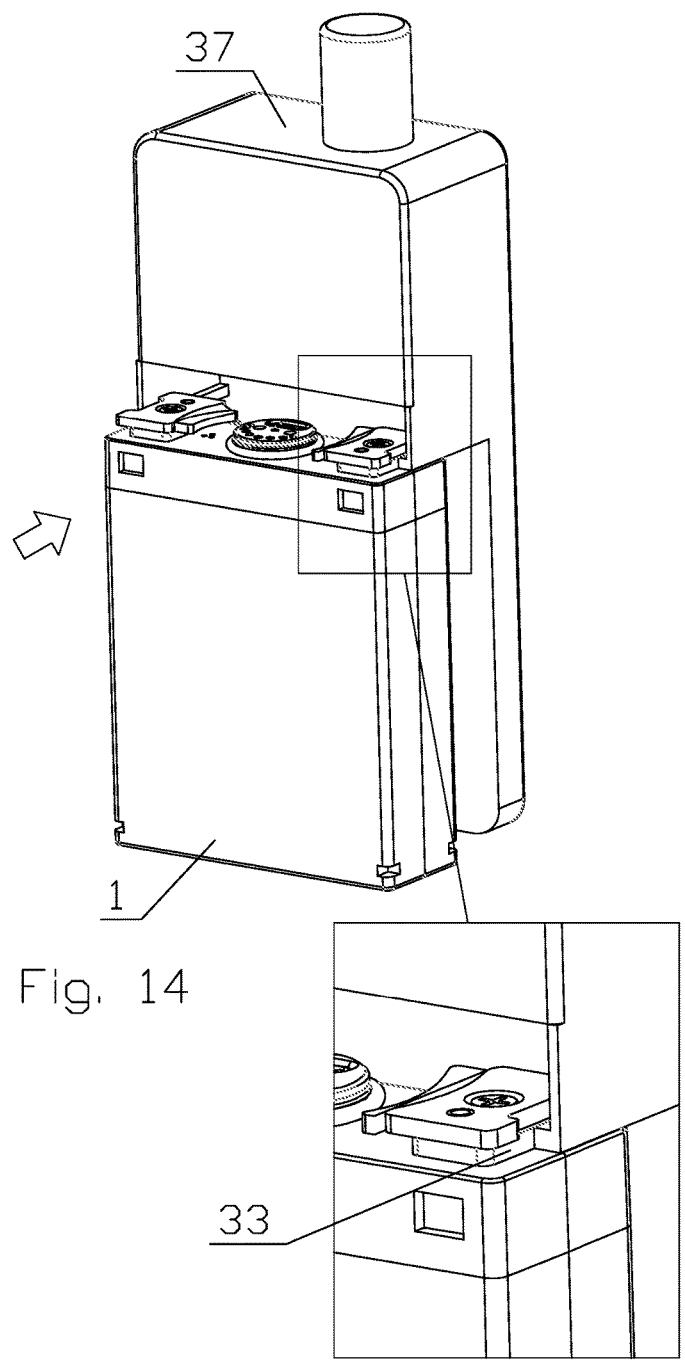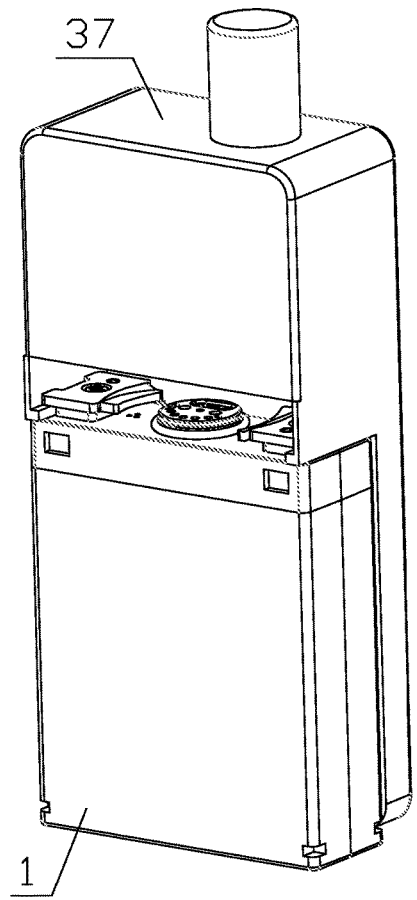
Fig. 14
Fig. 15

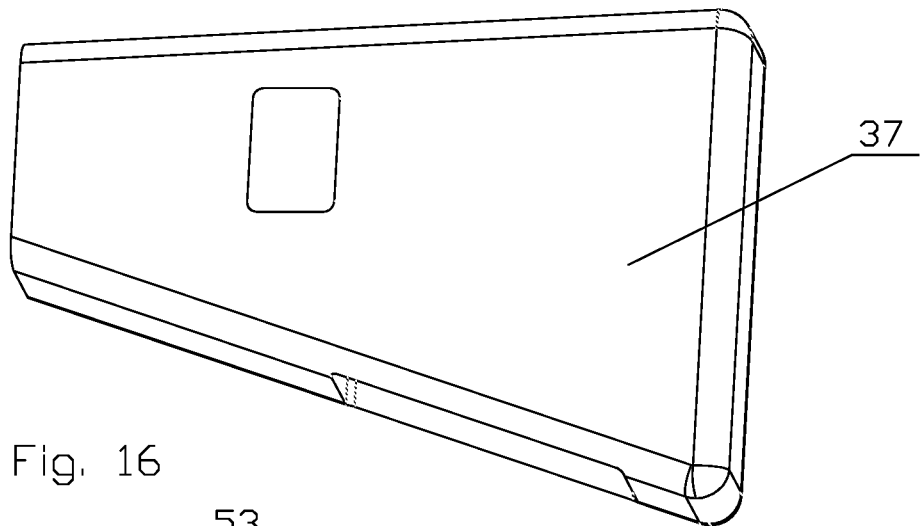
Fig. 16
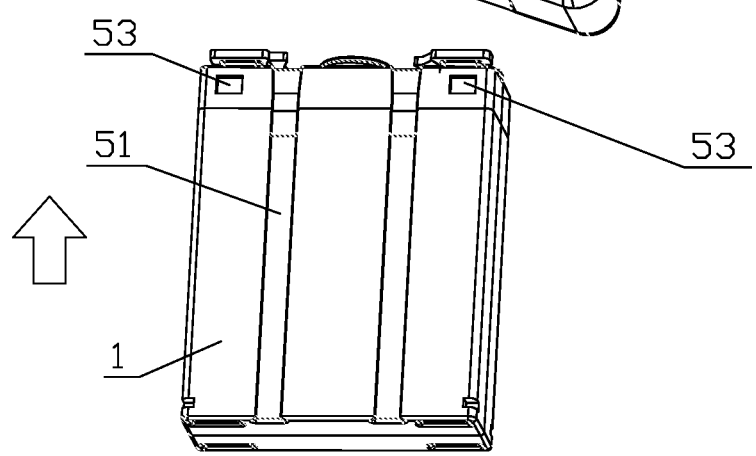
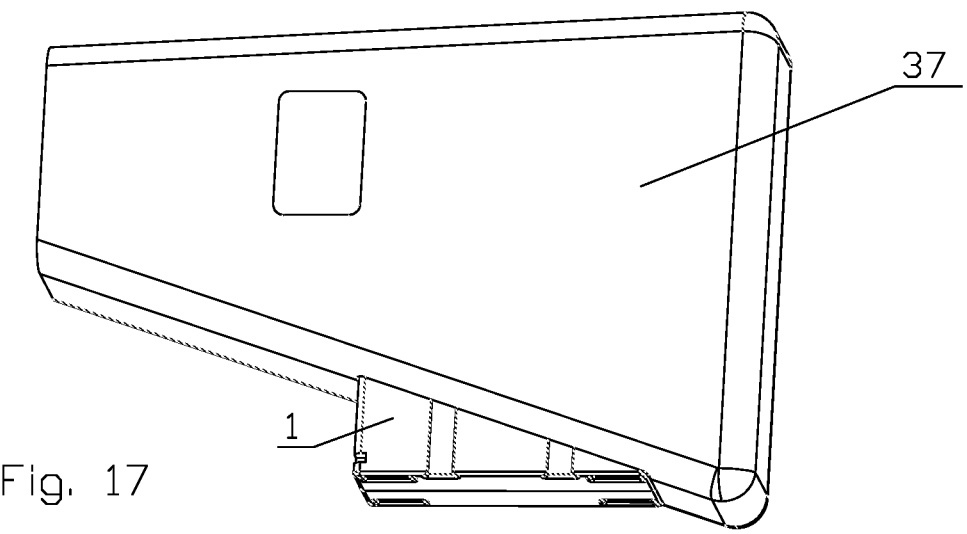
Fig. 17

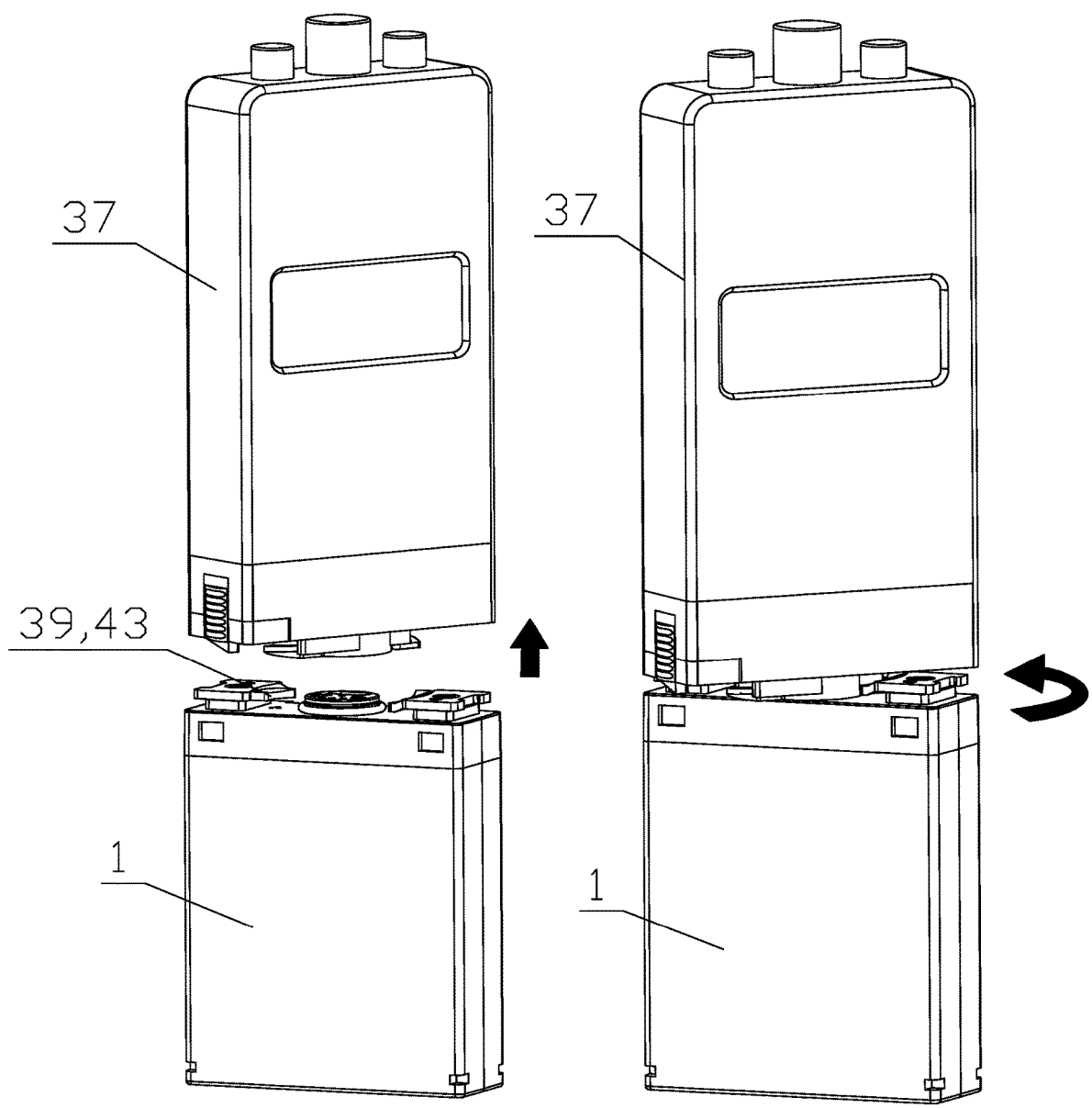

SMALL TACTICAL UNIVERSAL BATTERY AND METHODS OF INTERCONNECTION

GOVERNMENT LICENSE RIGHTS

This invention was made with government support under PO-0000985 (GTS) awarded by U.S. Army, Army Futures Command, Combat Capabilities Development Command, C5ISR Center, Command Power and Integration Directorate, Power Division, Tactical Power Branch. The government has certain rights in the invention.

BACKGROUND

Field of the Invention

This invention relates to batteries. More particularly, the invention relates to a battery provided with an interconnection interface which enables secure interconnection with a range of different host equipment via multiple insertion vectors and/or orientations.

Description of Related Art

Batteries are used to power portable electrical devices. To minimize electrical device size, reduce the time required for a battery exchange and/or enable use of different power capacity batteries according to a specific use/mission, batteries have been provided configured for attachment to external surfaces of the portable electrical devices. For example, in a military context, portable electrical devices may include: radios, global positioning systems, sighting systems, metal detectors, power tools et cetera. However, the ergonomics of these different electrical devices often requires battery interconnection via different insertion vectors and/or rotational mechanics, resulting in a requirement for different interconnection interfaces and thus different batteries even though the different electrical devices utilize similar power and/or dimensional requirements.

Therefore, an object of the invention is to provide battery solutions that overcome deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

FIG. 14 is a schematic view of a battery and electronic device during a short slide interconnection.

FIG. 15 is a schematic view of a battery and electronic device interconnected by a short slide interconnection.

FIG. 16 is a schematic view of initial alignment of a battery and electronic device for direct insert interconnection.

FIG. 17 is a schematic view of a battery and electronic device interconnected by a direct insert interconnection.

FIG. 18 is a schematic view of initial alignment of a battery and electronic device for twist interconnection mode.

FIG. 19 is a schematic view of initial contact between a battery and electronic device for a twist interconnection.

DETAILED DESCRIPTION

Figure 1:
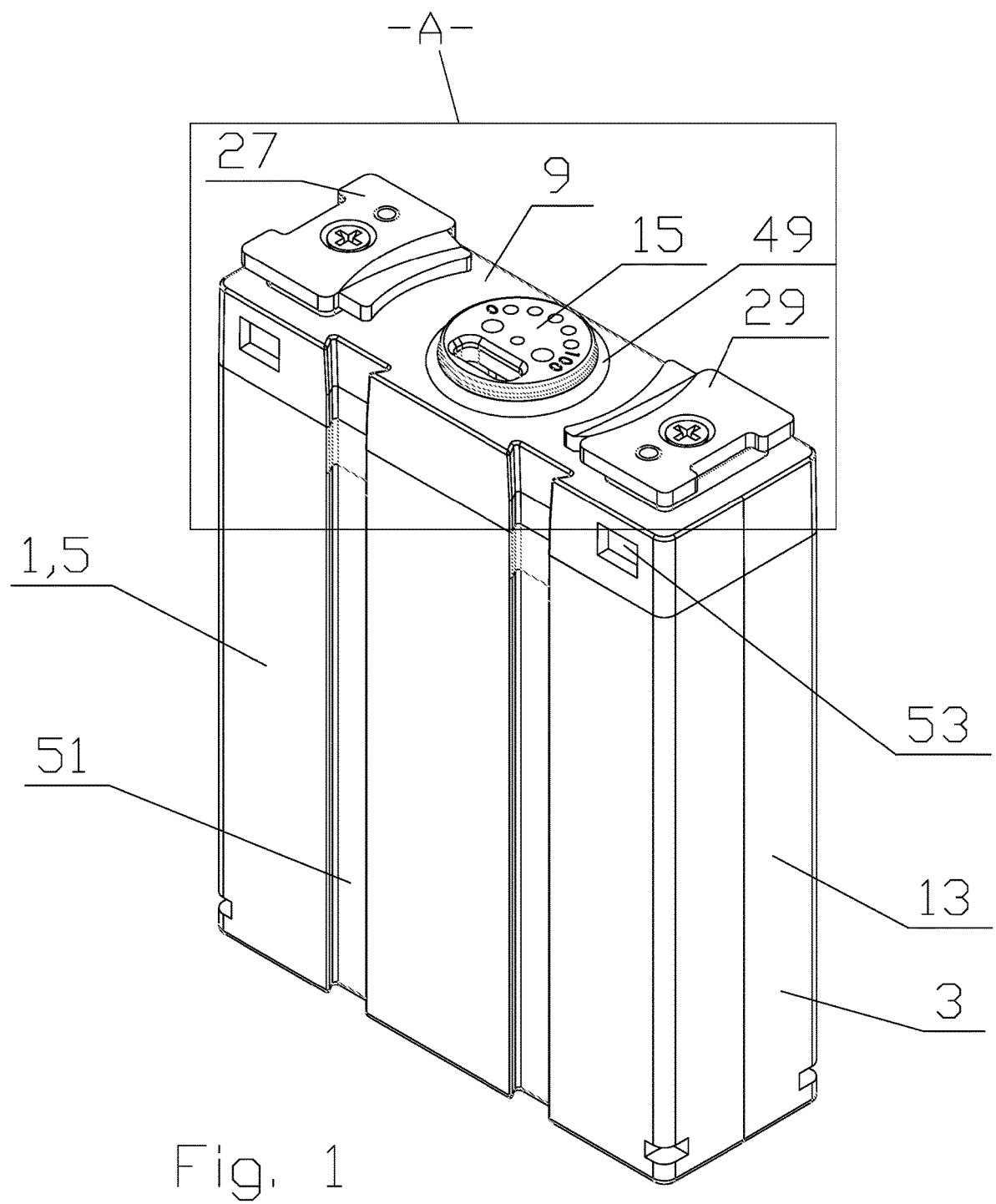
FIG. 1 is a schematic front and top angled isometric view of an exemplary battery.
Figure 2:
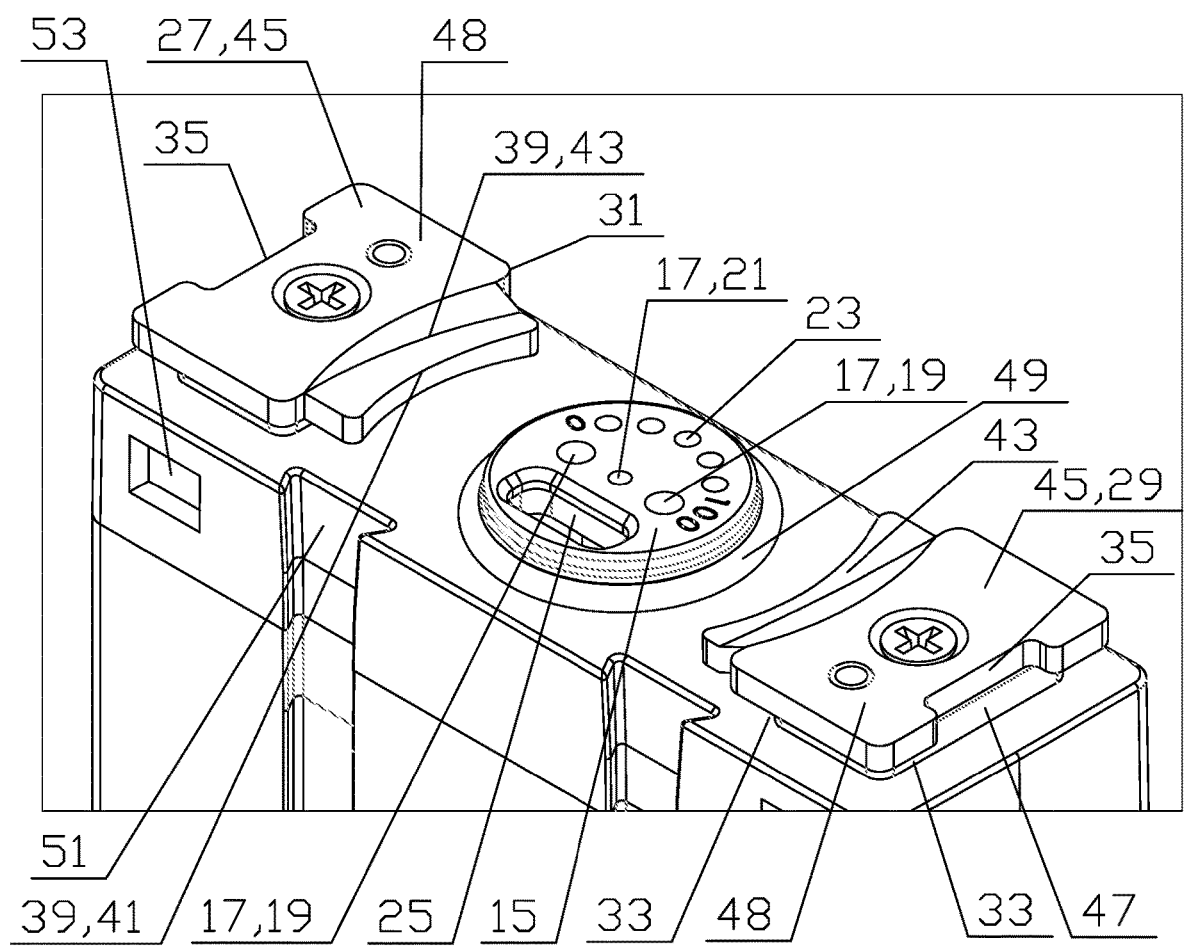
FIG. 2 is a close-up view of area -A- of FIG. 1.
Figure 3:
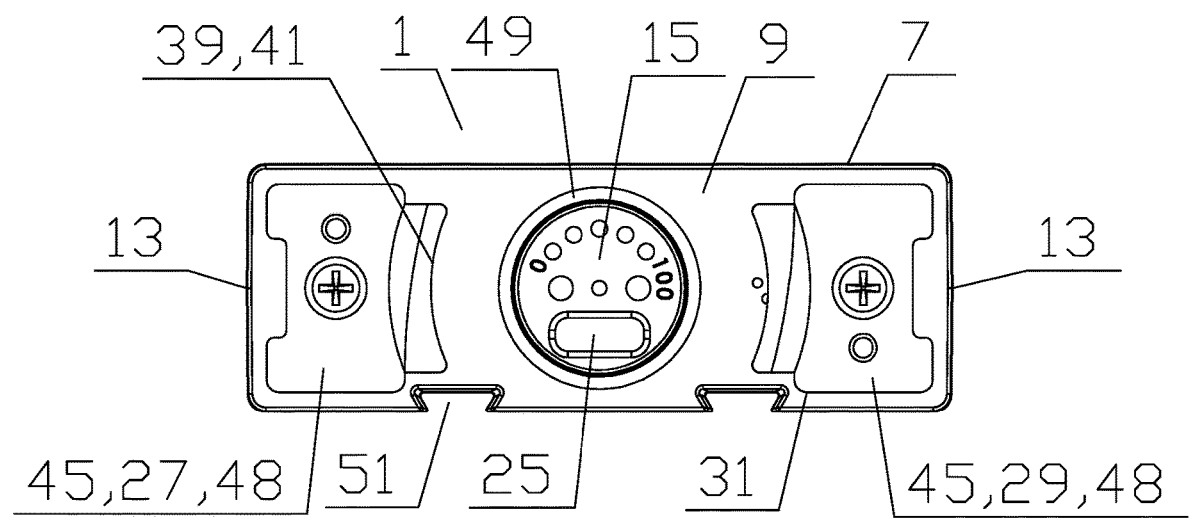
FIG. 3 is a schematic top view of the battery of FIG. 1.
Figure 4:
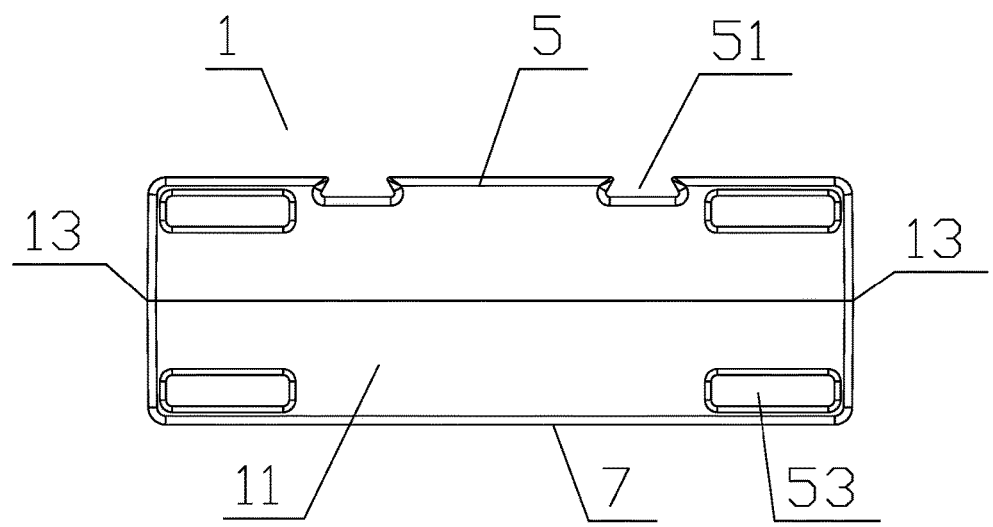
FIG. 4 is a schematic bottom view of the battery of FIG. 1.
Figure 5:
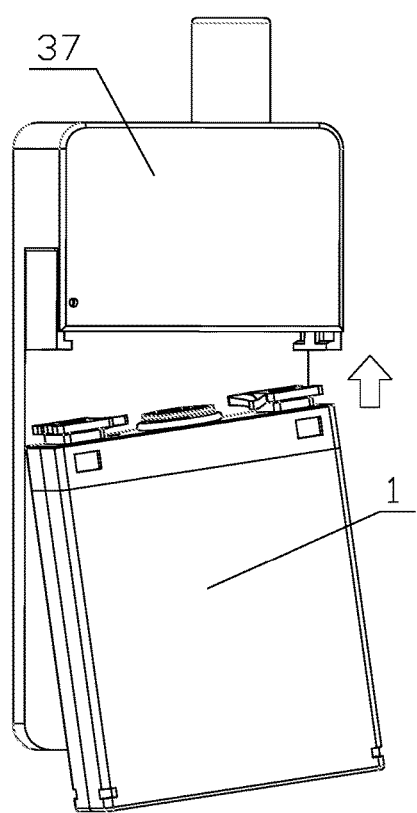
FIG. 5 is a schematic view of an initial orientation of an electronic device and a battery for hook and snap interconnection.
Figure 6:
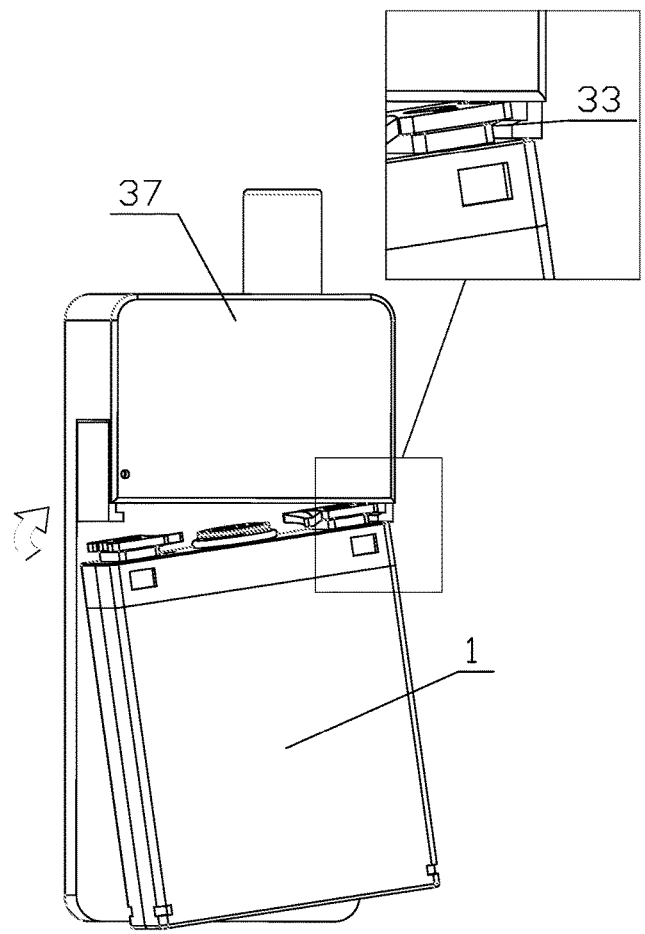
FIG. 6 is a schematic view of the hook and snap interconnection with the battery hooked onto the electronic device.

The inventors have recognized that a standardized battery configuration enables cost and time efficient battery production, warehousing, distribution and use with a wide range of electrical devices.

The inventors have invented a battery with an interconnection interface that accommodates a wide range of different electromechanical interconnection insertion vectors and/or rotational mechanics. Thereby, a single battery configuration is usable with a wide range of electrical devices and/or an individual battery may be exchanged between electrical devices as needed.

As best shown in FIGS. 1-4, an exemplary battery 1 may be provided with a generally cuboid body 3 with a front face 5, back face 7, top face 9, bottom face 11 and side faces 13. The body 3 may be formed, for example, of thermoplastic material via injection molding.

The top face 9 has a cylindrical terminal 15 extending from a center of the top face 9, the top of the cylindrical terminal 15 provided with electrical contacts 17. The electrical contacts 17 may include, for example, power contacts 19 such as Vbus, control signals 21 such as Vcc, and a Universal Serial Bus type C (USB-C) socket 25. State of charge indicia (such as light emitting diodes) 23 may also be provided on the cylindrical terminal 15.

Left and right tabs 27, 29 are provided extending from the top face 9 proximate the left and right ends of the top face 9, respectively. A peripheral portion 31 of each of the left and the right tabs 27, 29 forms a retaining groove 33 extending from the top face 9. Notches 35 may be provided in the peripheral portion 31 of the left and right tabs 27, 29 as a key feature to prevent lateral sliding during interconnection and/or as seats for latches or the like of the electrical device 37 the battery 1 will be used with.

An inward facing portion of the peripheral portion 31 of each of the left and the right tabs 27, 29 facing the cylindrical terminal 15 (hereafter "twist face 39") is provided with an arc radius 41 centered upon the center of the top face 9 (and thus of the cylindrical terminal 15). The twist faces 39 are provided with a ramp 43; the ramp 43 progressively increasing a spacing between a top of the retaining groove 33 and the top face 9, front face 5 to back face 7 on the right tab 29 and back face 7 to front face 5 on the left tab 27. As will be discussed further here below, these features enable an electrical device 37 twist connection mode where engaging the twist faces 39 pulls the top of the cylindrical terminal 15 into close contact with the electrical device 37 as the battery 1 is rotated with respect to the electrical device 37.

The top of the cylindrical terminal 15 and a top of the left and the right tabs 27, 29 may be coplanar, supporting slide interconnection modes.

The left tab and the right tab 27, 29 may each be provided as a metal portion 45 coupled to a post 47 extending from the top face 9. Further, the metal portions 45 may be operative as the ground contacts 48 of the battery 1.

As the power and control circuit electrical contacts 19, 21, state of charge indicia 23 and USB-C socket 25 are provided each in the top of the cylindrical terminal 15, instead of sealing each element individually, only this area requires more than simple environmental sealing. The environmental sealing may be provided by an elastomeric seal 49 on the periphery of the cylindrical terminal 15, for example as an O-ring.

The body 3 may be provided with a range of retention features. For example, vertical dovetail grooves 51 extending downward from the top face 9 may be provided for mating in vertical insertion modes with corresponding dovetail fins of the electrical device 37. For ease of initial insertion, the vertical dovetail grooves 51 may be tapered. Alternatively or additionally, detents 53 may be provided in the body 3, for example in the bottom, front, back and/or side faces 11, 5, 7, 13.

In use, the battery 1 may be charged via a USB-C connection to the USB-C socket 25, the state of charge indicia 23 providing feedback as to the charge level of the battery 1. USB-C charge protocol and the applicable electronic circuitry is a well-known industry standard and as such is not described in further detail herein. The USB-C connection may also be utilized as a power connection for any USB-C compatible device, for example via a USB-C cable.

The battery 1 may be interconnected with an electrical device 37 for power delivery via a wide range of interconnection modes, according to requirements of the selected electrical device 37. Electrical contacts of the electrical device 37 that engage corresponding electrical contacts on the top of the cylindrical terminal 15 as the battery 1 and electrical device 37 are aligned and interconnected are dependent upon the electrical device 37 configuration and the interconnection mode to be utilized. Therefore, electrical device 37 details other than the surfaces engaged, mating vectors and/or mechanics are not further disclosed herein.

Figure 7:
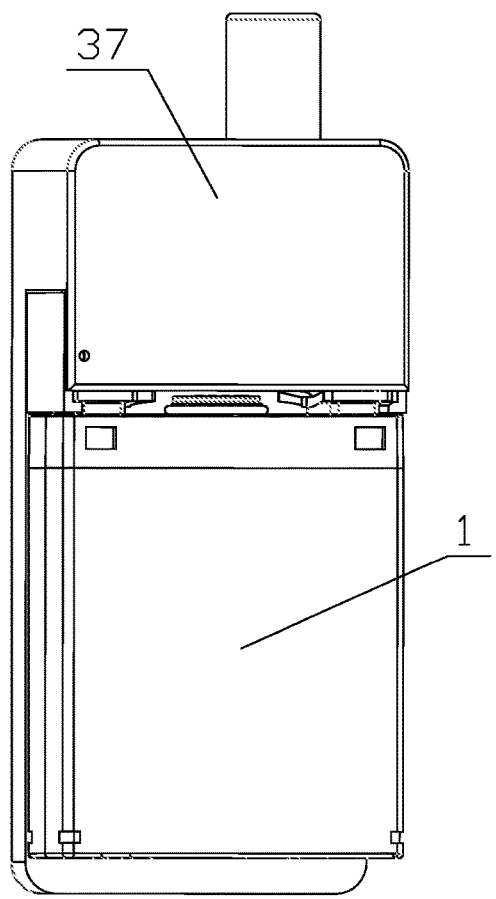
FIG. 7 is a schematic view of the hook and snap interconnection completed.
Figure 8:
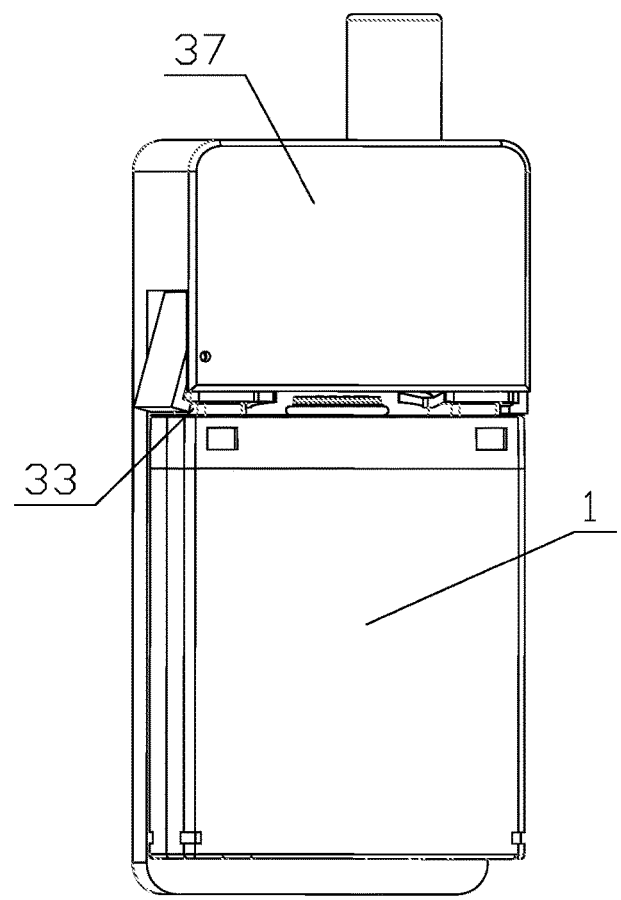
FIG. 8 is a schematic view of initial disconnection from the hook and snap interconnection.

In a hook and snap interconnection mode, for example as shown in FIGS. 5-8, the electrical device 37 is hooked into the retaining groove 33 at the right or left side while the battery 1 is angled (FIG. 6) and the battery 1 is then pivoted until the top of the cylindrical terminal 15 engages the electrical device 37 and the electrical device 37 engages the retaining groove 33 at the left or right side, respectively (FIG. 7). To release the battery 1, the electrical device 37 disengages the retaining groove 33 (FIG. 8).

Figure 9:
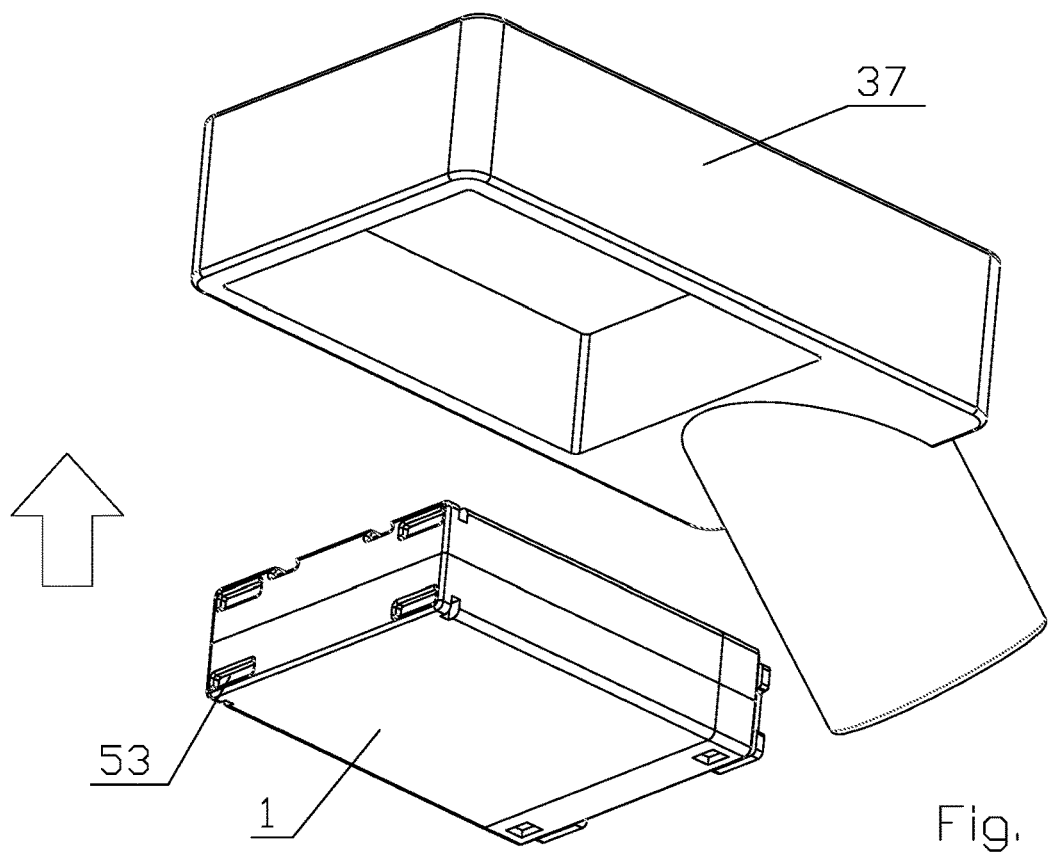
FIG. 9 is a schematic view of initial alignment of a battery for an insert and snap interconnection with an electronic device.
Figure 10:
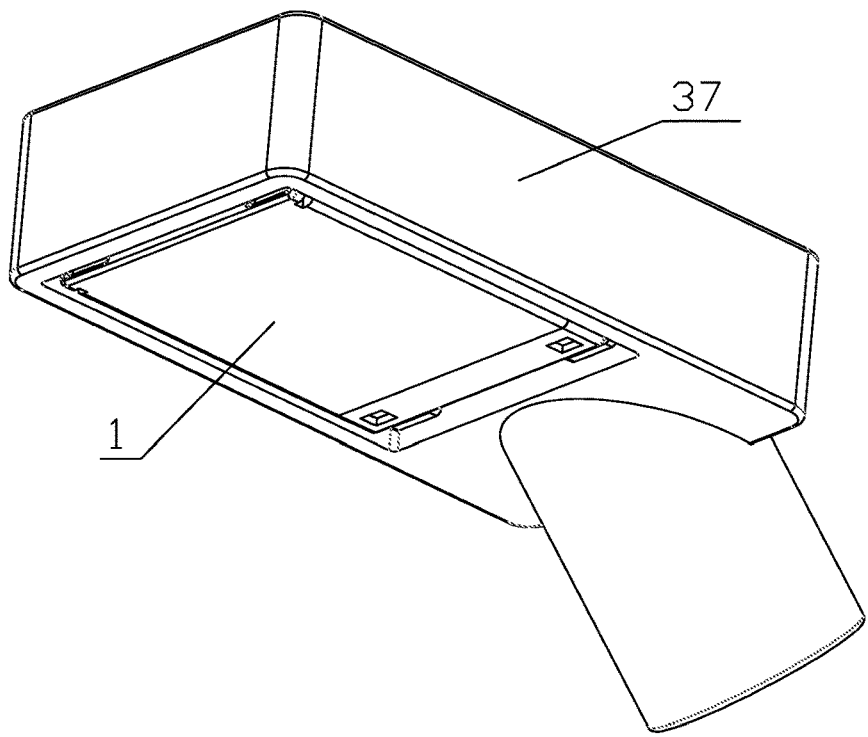
FIG. 10 is a schematic view of an electronic device and battery interconnected by an insert and snap interconnection.

In an insert and snap interconnection mode, for example as shown in FIGS. 9 and 10, battery 1 is inserted into the electrical device 37 until the electrical device 37 engages at least the top of the cylindrical terminal 15 and the electrical device 37 engages a detent 53 provided in the bottom face 11 of the body 3.

Figure 11:
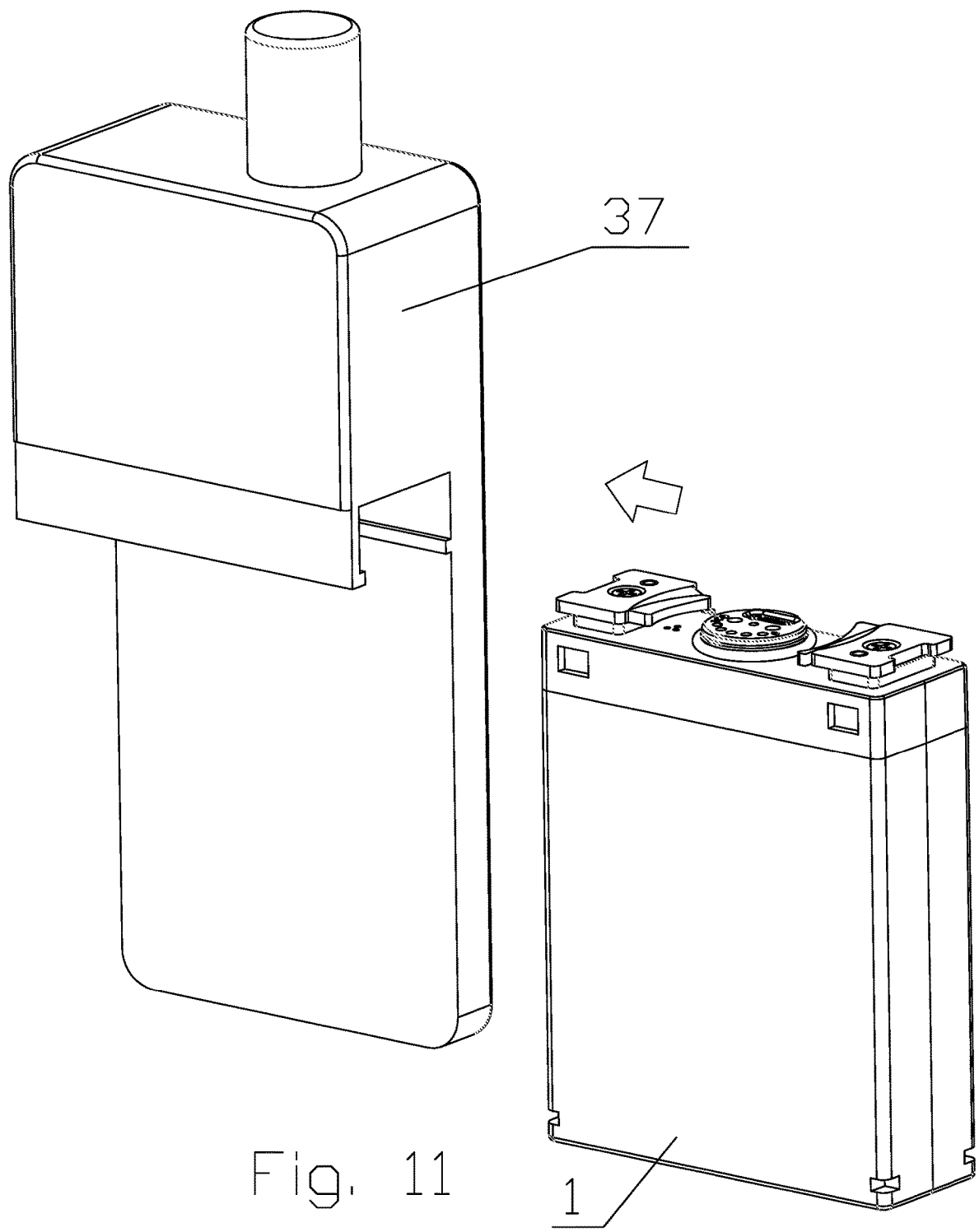
FIG. 11 is a schematic view of initial alignment of a battery and electronic device for long slide interconnection.
Figure 12:
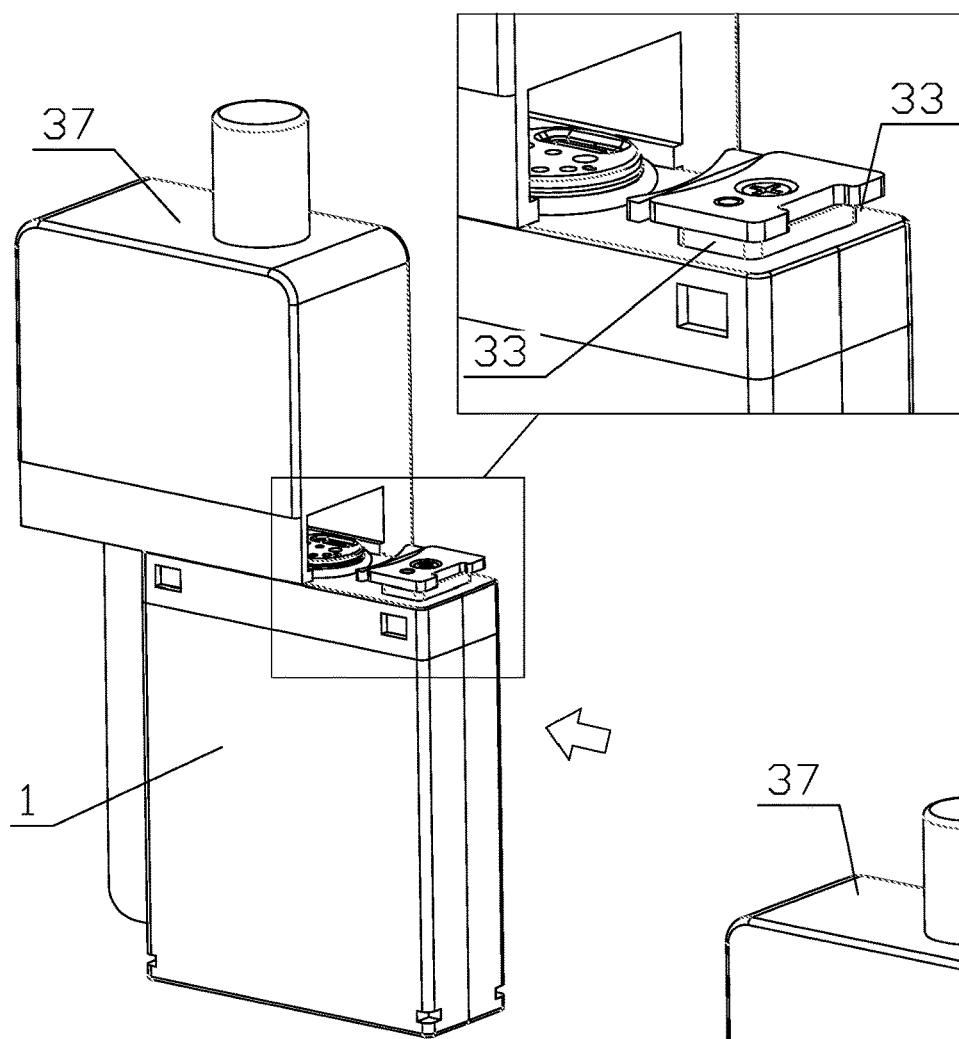
FIG. 12 is a schematic view of a battery and electronic device during a long slide interconnection.
Figure 13:
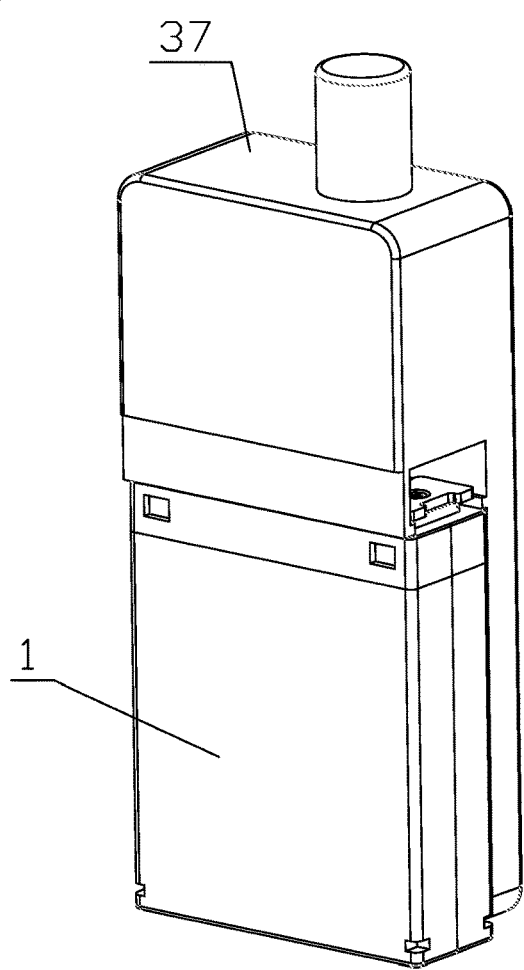
FIG. 13 is a schematic view of a battery and electronic device interconnected by a long slide interconnection.

In a long slide interconnection mode, for example as shown in FIGS. 11-13, the battery 1 is moved laterally into the electrical device 37 until the electrical device 37 engages the retaining groove 33 open to the front face 5 and the back face 7 of the body 3 and the top of the cylindrical terminal 15 engages the electrical device 37.

In a short slide interconnection mode, for example as shown in FIGS. 14 and 15, the battery 1 is moved toward the electrical device 37 until the electrical device 37 engages the retaining groove 33 open to the right end and the left end; and the top of the cylindrical terminal 15 engages the electrical device 37.

In a direct insert and snap interconnection mode, for example as shown in FIGS. 16 and 17, the battery 1 is inserted into the electrical device 37 until the top of the cylindrical terminal 15 engages the electrical device 37 and the electrical device 37 engages a detent 53 and/or dovetails 51 on the body 3.

Figure 20:
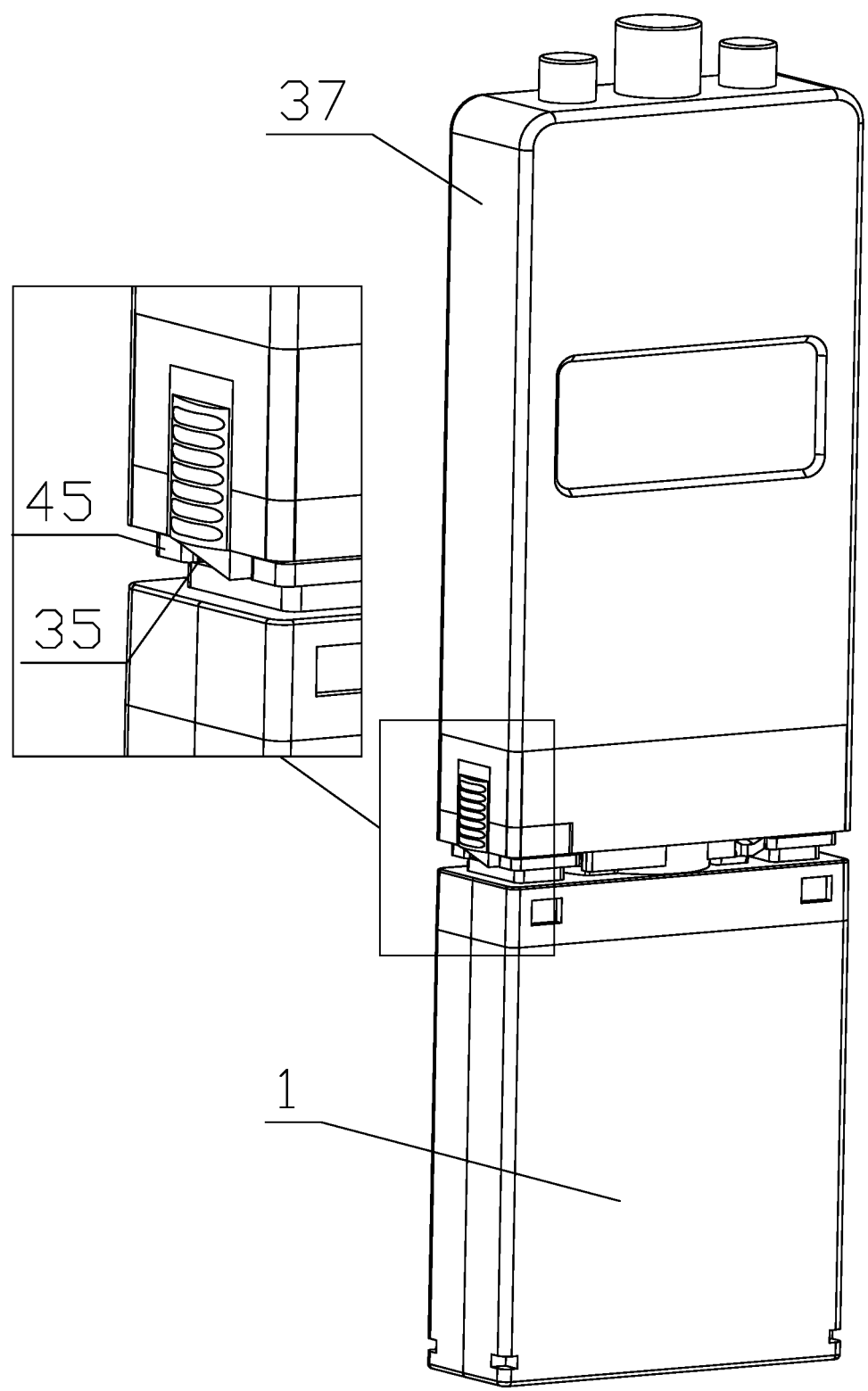
FIG. 20 is a schematic view of a battery and electronic device interconnected by a twist interconnection.

In a twist interconnection mode, for example as shown in FIGS. 18-20, the top of the cylindrical terminal 15 is mated with the electrical device 37 and the battery 1 is rotated with respect to the electrical device 37 until the electrical device 37 engages the twist faces 39 of the right and left tabs 29, 27, whereby the ramp 43 of the twist faces 39 pulls the battery 1 into secure engagement with the electrical device 37. As shown in FIG. 20, the battery 1 may be releasably secured on the electrical device 37 by keying a notch 35 of the metal portion 45.

One skilled in the art will appreciate that the wide range of interconnection modes enable the battery 1 to be used with a wide range of electrical devices 37, which solves the issue of proprietary device batteries that are not swappable between other devices, which causes multiple issues ranging from complex supply chain to potentially not being able to swap a battery between devices in an emergency, such as on the battlefield.

Further, while the battery 1 has been demonstrated via the exemplary embodiment shown in the figures, if the top face 9 and associated circuitry, connection and retention features are maintained, the size of the battery 1 may be modified to provide different levels of power by changing the height dimension, only, to provide flexibility in power versus weight/size tradeoffs. For example, if the exemplary battery 1 is a four-cell battery as shown, halving the body 3 height dimension or doubling it would enable mission specific selection of batteries 1 with two or eight cells and the corresponding half or double battery power capacity. Alternatively, the width dimension of the body 3 may also be modified.

| Table of Parts | |
|---|---|
| 1 | battery |
| 3 | body |
| 5 | front face |
| 7 | back face |
| 9 | top face |
| 11 | bottom face |
| 13 | side face |
| 15 | cylindrical terminal |
| 17 | electrical contact |
| 19 | power contact |
| 21 | control signal |
| 23 | state of charge indicia |
| 25 | USB-C socket |

-continued

Table of Parts

| | |
|---|---|
| 27 | left tab |
| 29 | right tab |
| 31 | peripheral portion |
| 33 | retaining groove |
| 35 | notch |
| 37 | electrical device |
| 39 | twist face |
| 41 | arc radius |
| 43 | ramp |
| 45 | metal portion |
| 47 | post |
| 48 | ground |
| 49 | elastomeric seal |
| 51 | dovetail groove |
| 53 | detent |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. A battery, comprising:
    a cuboid body with a top face,
    a cylindrical terminal extending from a center of the top face, a top of the cylindrical terminal provided with electrical contacts;
    a left tab and a right tab provided extending from the top face proximate a left end and a right end of the top face, respectively;
    a peripheral portion of each of the left and the right tabs forming a retaining groove extending from the top face; and
    an inward facing portion of the peripheral portion of each of the left and the right tabs facing the cylindrical terminal provided with an arc radius centered upon the center of the top face.

2. The battery of claim 1, wherein the inward facing portion of the peripheral portion of each of the left and the right tabs facing the cylindrical terminal are provided with a ramp; the ramp increasing a spacing between a top of the retaining groove and the top face from a front side to a back side on the right tab and increasing a spacing between a top of the retaining groove and the top face from a back side to a front side on the left tab.

3. The battery of claim 1, wherein a top of the cylindrical terminal and a top of the left and the right tabs are coplanar.

4. The battery of claim 1, wherein the left tab and the right tab are each provided as a metal portion coupled to the top face.

5. The battery of claim 4, wherein the metal portions are operative as the ground contacts of the battery.

6. The battery of claim 1, wherein the top of the cylindrical terminal includes a Universal Serial Bus type C connection interface socket.

7. The battery of claim 1, wherein the top of the cylindrical terminal includes a state of charge indicia.

8. The battery of claim 1, further including an environmental seal provided on a periphery of the cylindrical terminal.

9. The battery of claim 8, wherein the environmental seal is an o-ring.

10. The battery of claim 1, further including vertical dovetail grooves on a front face, the vertical dovetail grooves extending downward from the top face.

11. The battery of claim 10, wherein the vertical dovetail grooves are tapered.

12. The battery of claim 1, further including detents in the front face and a back face.

13. The battery of claim 1, wherein the body is thermoplastic material.

14. A method for attaching a battery to an electrical device, comprising the steps of:
    providing a battery according to claim 1,
    engaging the electrical device into the retaining groove at the right or left side while the battery is angled; and
    pivoting the battery until the top of the cylindrical terminal engages the electrical device and the electrical device engages the retaining groove at the left or right side, respectively.

15. A method for attaching a battery to an electrical device, comprising the steps of:
    providing a battery according to claim 1,
    inserting the battery into the electrical device until the electrical device engages the top of the cylindrical terminal and the electrical device engages a detent provided in a bottom face of the body.

16. A method for attaching a battery to an electrical device, comprising the steps of:
    providing a battery according to claim 1,
    moving the battery laterally into the electrical device until the electrical device engages the retaining groove open to a front face and a back face of the body; and
    the top of the cylindrical terminal and engages the electrical device.

17. A method for attaching a battery to an electrical device, comprising the steps of:
    providing a battery according to claim 1,
    moving the battery toward the electrical device until the electrical device engages the retaining groove open to the right end and the left end; and
    the top of the cylindrical terminal and engages the electrical device.

18. A method for attaching a battery to an electrical device, comprising the steps of:
    providing a battery according to claim 1,
    inserting the battery into the electrical device until the top of the cylindrical terminal engages the electrical device; and the electrical device engages a detent on a front face and/or a back face of the body.

19. A method for attaching a battery to an electrical device, comprising the steps of:
    providing a battery according to claim 1,
    mating the top of the cylindrical terminal with the electrical device; and rotating the battery until the electrical device engages the retaining groove of the inward facing portion of the peripheral portion of each of the left and the right tabs facing the cylindrical terminal.

* * * * *